Figure 1:
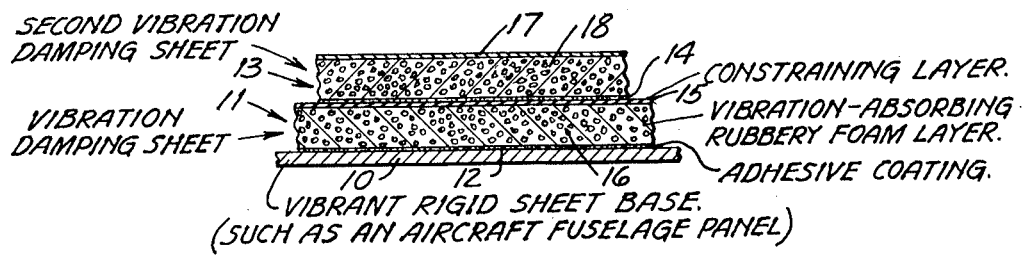

Dec. 8, 1964   D. B. CALDWELL ETAL   3,160,549
VIBRATION DAMPING STRUCTURES
Filed Dec. 29, 1960

INVENTORS
DONALD B. CALDWELL
JAMES N. BROWN
EDWARD G. LAVIGNE
BY
Carpenter, Abbott, Coulter & Kinney
ATTORNEYS

United States Patent Office 3,160,549
Patented Dec. 8, 1964

3,160,549
VIBRATION DAMPING STRUCTURES
Donald B. Caldwell and James N. Brown, White Bear Lake, and Edward G. Lavigne, Mendota Heights, Minn., assignors to Minnesota Mining and Manufacturing Company, St. Paul, Minn., a corporation of Delaware
Filed Dec. 29, 1960, Ser. No. 79,330
3 Claims. (Cl. 161—161)

This invention relates to the damping of vibrations induced in vibrant rigid sheets or panels, such as aluminum fuselage panels of aircraft, thin steel or plastic body panels of motor vehicles and of household appliances, and thin hulls of boats, etc. The resonant and forced vibrations of such sheets or panels, unless restrained, can be highly objectionable. Such vibrations are induced by external agencies and cannot always be feasibly avoided by going after the source or by shielding or isolating the sheet or panel, or by the design of the vibrant structural arrangement itself.

The invention provides a novel combination of a flexible vibration damping sheet adhered to such a vibrant sheet or panel base by means of pressure-sensitive adhesive and adapted to provide effective vibration attenuation with only a relatively small increase of weight per unit area. Use is made of a vibration-energy absorbing foam layer (adhered to the vibrant base) which is constrained by being bonded to an overlying metal foil or equivalent constraining layer. This foam layer is of a highly flexible, soft and "lossy" rubbery nature, as distinguished from rigid and semi-rigid types of foam layers and from live rubber foam layers. It has been found that certain polyurethane foams are admirably adapted for present usage.

The problem of vibration damping is particularly acute in the case of aircraft fuselage panels due to the magnitude of the vibrations and to the weight limitation which necessitate the use of very thin panels (e.g., aluminum panels of 40 mils thickness) and restricts the weight of remedial agencies that can be tolerated. Vibration not only produces audible noise that is tiring and irritating to the crew and to passengers, but causes fatigue in the metal panels and associated metal structures that reduces strength and may even lead to structural failure. The problem is to adequately limit the degree of vibration and yet achieve the lightest practical total fuselage weight. By sufficiently increasing the thickness of a vibrant panel (thereby increasing its stiffness and mass per unit area), any desired reduction of objectionable vibration and noise can be achieved, due to the shifting of the resonant frequency of the panel that can be effected in this way, but this requires too much of an increase in weight to be permissible in aircraft design. And even in the design of housings for appliances and hulls for boats, etc., where weight as such is not such a critical factor, the modern tendency is toward the use of the thinnest possible sheeting, for ease of fabrication and assembly and to decrease the cost.

Sound absorbing coatings or curtains will absorb sound vibrations (noise) emitted by vibrating panels but do not effectively suppress the proximate source of the noise, or prevent metal fatigue, or inhibit the transmission of vibrations to and along structural members connected to the vibrating panels.

Effective use in aircraft has heretofore been made of structures which provide a viscoelastic adhesive coating bonded to the interior surface of the metal fuselage panel and a constraining layer bonded to the surface of the coating. A convenient expedient has been to apply over the interior surface of the panel one or more layers of a suitably designed flexible pressure-sensitive adhesive damping sheet or tape consisting of an aluminum foil backing (which provides a constraining layer) carrying a normally and aggressively tacky viscoelastic pressure-sensitive adhesive layer. The contiguous viscoelastic adhesive layer is thus bound and restrained between the opposing surfaces of the vibrant metal panel and the aluminum foil constraining layer, and is subjected to vibratory shearing stresses induced by vibrations of the panel. In any overlying layer of another adhesive sheet or tape, the adhesive layer is bound and restrained between two layers of foil and is subjected to vibratory shearing strains induced by vibration of the underlying material. Such multilayer constructions are approximately equivalent to the use of a single adhesive sheet or tape of corresponding total weight in its foil and adhesive layer elements.

The substantial viscous or so-called "lossy" characteristic of the viscoelastic adhesive layer (or layers) causes the vibratory shearing strains to generate heat energy in the adhesive which in this way absorbs and dissipates an equal amount of mechanical vibration energy; making it possible for the adhesive to effectively attenuate or damp the vibration of the base sheet or panel. Absent the constraining layer, the adhesive layer would not undergo adequate vibratory shearing strains. Absent the viscous characteristic, the adhesive layer would not absorb mechanical vibration energy by converting it to heat, but would merely act as a springy material that alternately stores and releases vibration energy. The "lossy" characteristic can be numerically expressed by the "loss tangent" value of the adhesive, which can be measured for different frequencies and temperatures as is well known, for instance by use of a Fitzgerald apparatus.

The present invention provides a damping sheet structure which is more conveniently and easily applied or built up on vibrant metal or other rigid base panels or sheets than is the just-described damping sheet or tape. In particular, the invention can be practiced by use of preformed ready-to-lay foam-type sheets that are well-adapted for easy manual application to airplane fuselage panels to obtain intimate permanent bonding to curved surfaces and over irregularities and protuberances (such as rivet heads). It has been discovered that vibration-damping efficiencies can be achieved which are at least as great as can be obtained by use of the prior art foil-backed adhesive sheets or tapes described above, making comparisons on an equal weight per unit area basis and with respect to commercially useful embodiments. It is believed that there is a definite advantage when damping efficiency over a broad frequency range is needed. Greater versatility in design is permitted since the adhesive bonding layer is not relied upon as the functional vibration-absorbing element of the structure, and can be selected solely on the basis of its bonding function; and the vibration-absorbing foam layer can be selected on the basis of its damping function.

A further important advantage of the present structure is that the foam layer provides substantial thermal insulation, particularly when employed in combination with a metal foil backing (which reflects radiant heat and is substantially spaced by the air-containing foam layer away from the base panel or sheet). The present structure also provides a desirable shock-absorbing buffer over thin metal panels; and results in a stiffer and more "solid" panel.

The invention will now be described in connection with the accompanying diagrammatic drawing (not to scale):

FIG. 1 broadly illustrates the novel combination structure, wherein a vibrant rigid sheet of panel base 10 (such as an aircraft fuselage panel) carries a relatively thick preformed ready-to-lay vibration damping sheet 11 which includes a thin resilient pressure-sensitive adhesive film coating 12 adapted to maintain a permanent bond (i.e., a bond that will not be disrupted by vibration and will maintain an intimate contact between the damping sheet and the base). In this construction, the thin adhesive coating merely serves to bond the damping sheet to the base and does not contribute significantly to the vibration-absorbing effect; as distinguished from the vibration-damping adhesive layer in the previously described structure of the prior art. A multi-layer damping sheet structure can be employed by successively applying two or more damping sheets (in lieu of a single sheet of comparable total thickness and weight), as is illustrated in FIG. 1 by the second damping sheet 13 which is bonded to the back of the first sheet by its adhesive coating 14. Such successively applied sheets need not be identical and can vary as to thickness in building up a structure of desired characteristics.

Damping sheet 11 consists of a flexible but planar-rigid constraining layer 15 serving as the backing and bonded to the relatively much thicker vibration-absorbing rubbery foam layer 16, which is bonded to the base sheet or panel by the above-described thin adhesive coating 12. Similarly, the second damping sheet 13 (which may or may not be identical) consists of a constraining layer backing 17 bonded to rubbery foam layer 18, which is bonded to the backing (constraining layer) of the underlying damping sheet by adhesive coating 14.

Figure 2:
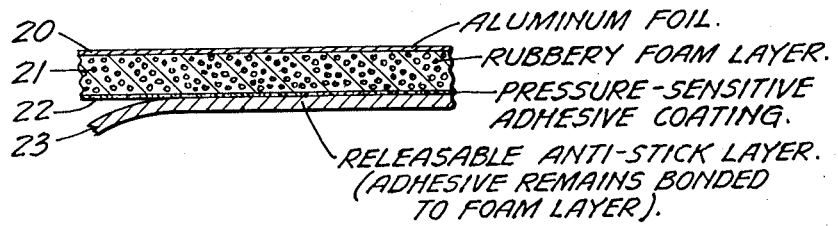

FIG. 2 illustrates a novel and preferred flexible damping sheet of the preformed ready-to-lay type which as manufactured and sold is protected by a removable liner. This sheet product is comprised of an aluminum foil backing 20 integrally bonded to a much thicker vibration-absorbing rubbery foam layer 21, which is bonded on its face side to a continuous thin adhesive film 22 of a normally and aggressively tacky pressure-sensitive adhesive, the latter being covered and protected by a releasable anti-stick liner layer or sheet 23.

This sheet can be readily cut to any desired shape and, after removal of the liner, can be permanently adhered to the surface of a vibrant metal or other base by merely pressing into place. Intimate bonding can be effected even though the base is curved and even though there are irregularities or protuberances such as rivet heads, owing to the flexibility and compressibility characteristics of the applied sheet. The foil backing may consist solely of an aluminum foil, or of an aluminum foil laminate such as a foil-paper laminate having the paper side bonded to the foam rubber layer, either of which provides the constraining layer of the structure. An advantage of a foil-paper laminate constraining layer is that a thin foil can be used without danger of wrinkling when the damping sheet is being applied, and a tougher backing is provided which is less likely to become accidentally punctured.

The foam layer of the damping sheet of this invention is a soft viscoelastic rubbery foam having a typical thickness of approximately ¼ inch although thicknesses in the range of about ⅛ to one inch may be employed. Polyurethane foams (of this soft rubbery type) are a preferred example and may be produced from a liquid foam-forming mixture of water, catalyst and suitable polyurethane prepolymer which is extruded into a mold where reaction occurs to form a stable foam sheet of the desired thickness, having its exterior planar surfaces filmed or skinned over as a covering for the porous interior. The thickness can be decreased (and the bulk density correspondingly increased), if desired, by "post-forming" (physically compacting the foam as it forms). The final foam layer should have a "bulk density factor" in the range of about 0.05 to 0.5, by which is meant the ratio of the bulk density of the foam to the density of the solid phase (i.e., the rubbery cellular structure per se). Soft rubbery types of polyurethane foam layers having a bulk density in the range of about 10 to 30 pounds per cubic foot are preferred, although densities down to about 3 pounds per cubic foot are useful. After being momentarily compressed, the foam layer will promptly recover its normal thickness upon being released (i.e., it is "recoverable") but it does not snap back the way a springy live rubber foam does, due to its viscoelastic or lossy nature. The cellular structure is non-adherent and thus does not stick together when compressed.

The foam layer should have a loss tangent value (beta) in the range of 0.3 to 2.5; and a storage shear modulus ($G'$) in the range of $10^5$ to $10^9$ dynes/sq. cm.; measured at room temperature over the frequency range of 100 to 1000 c.p.s.; thus having a soft viscoelastic (lossy rubbery) characteristic that is needed for present purposes.

The preparation of preferred polyurethane foams is described in U.S. Patent No. 2,921,916. Suitable foam layers can be made from other polymeric materials, including foams made from plasticized or unplasticized polyvinyl chloride, polyisobutylene, polyethers, polyesters, silicone rubbers, fluorocarbon rubbers, butyl rubber and polychloroprene. The foam-forming mixture may include finely divided filler material, such as refined clays, zinc oxide, titanium dioxide, vermiculite, wood flour, etc., so as to load the cellular phase of the foam product and modify the physical properties (and cost) of the foam layer.

Ready-to-lay types of damping sheets (see FIG. 2) can be readily manufactured by forming the foam layer between the backing (constraining layer) and the adhesive coated liner, one of which has been positioned on the bottom of the mold and the other against the top, resulting in a unitary sheet due to bonding of the foam layer in its sandwiched position. This technique and certain products thereof are described and broadly claimed in the copending application of Campbell and Buchholtz, Ser. No. 819,133, filed June 9, 1959. In this case it is generally desirable to employ an adhesive coated liner having a thin adherent barrier coating over the adhesive so as to protect the adhesive from the foam-forming mixture, the foam then bonding to the surface of the intermediate barrier coating and thus becoming unified to the adhesive coating on the removable liner.

The constraining layer which overlies and is bonded to the foam layer is a relatively thin and flexible solid element but, as is illustrated by aluminum foil, it is relatively stiff and inextensible with respect to forces of tension in its own plane. The term "planar rigid" characterizes it in this sense. In order to properly perform its present function, the constraining layer should have a tensional stiffness value that is at least 10 times as great as the shear stiffness value of the foam layer, measured at room temperature and over the frequency range of 100 to 1000 c.p.s. The "tensional stiffness" is equal to Young's modulus (at a given frequency) multiplied by the thickness of the layer. The "shear stiffness" is equal to the storage shear modulus (at a given frequency) divided by the thickness of the layer. In calculating these stiffness values for this purpose, the thicknesses of the layers in centimeters should be used.

An aluminum foil of 1 mil thickness provides an excellent constraining layer backing for the present polyurethane foam layers and the like to be employed for damping thin sheet metal panels. As previously mentioned, the preferred foil type is a foil-paper laminate, for instance an aluminum foil of 1 mil thickness cemented by a very thin casein-neoprene adhesive coating to a supercalendered kraft paper weighing about 200 pounds per thousand square yards; the composite constraining layer having a thickness of 5 mils and weighing about 330 pounds per thousand square yards.

The normally tacky pressure-sensitive adhesive coating employed in preformed ready-to-lay damping sheet constructions should have a high degree of tack and form a strong permanent bond to metal and other typical panels when the damping sheet is pressed into contact, and it should have a high internal or cohesive strength (shear strength). These properties assure a permanent intimate contact even when the sheet is applied to surfaces having compound curves, or irregularities or protuberances such as rivet heads, and preclude slipping or creeping on vertical surfaces, despite long-continued vibration of the base panel. The adhesive should be stable under the range of temperatures to be encountered. A suitable coating weight (dry basis) is about 5 to 15 grains per 24 square inches (about 40 to 120 lbs. per thousand square yards), the dry adhesive coating having a thickness of about 1 to 3 mils.

The presently preferred pressure-sensitive adhesives are viscoelastic polyacrylates which inherently have the desired properties, such as the acrylate copolymers (e.g., a 90:10 copolymer of isooctyl acrylate and acrylic acid) which are described in U.S. Patent Re. 24,906.

Because of the soft spongy nature of the foam damping sheet, the thin adhesive coating is best applied by a transfer procedure. The adhesive, as a solution in a volatile solvent or as a latex dispersion in water, is coated on a smooth liner sheet having a shiny-smooth anti-stick surface, such as a polyethylene film or a paper coated with a silicone resin release agent, and dried. A preformed foam layer can be readily laminated by mere contact with the tacky adhesive side of the liner; the liner being removed whenever desired to expose the tacky adhesive film that has become bonded to the rubbery foam layer. This procedure also has the advantage of providing the foam layer with a thin pressure-sensitive adhesive coating that has a shiny-smooth (or "mirror finish") surface adapted to intimately contact a metal panel or other base to which the foam layer is to be subsequently adhered for vibration damping.

A foam layer can be laminated on both sides to such pressure-sensitive adhesive coated liners to provide a double-coated structure. The liner on one side can be removed to permit of adhesive bonding to the foil or other desired constraining layer backing. As previously indicated, the adhesive-coated liner may be provided with a thin impermeable barrier film coated over the exposed surface of the adhesive coating. This coating is selected so that the barrier film will be compatible with and effect a strong bond to both the foam layer and to the pressure-sensitive adhesive coating, and will have high internal strength, so as not to weaken the laminated product or permit of delamination. It should be immune to the foam-producing chemical mixture and provide a barrier to prevetn the latter (and its reaction products) from adversely effecting the underlying adhesive coating and its releasable relationship to the liner sheet. Thus it should be water-insoluble when an aqueous foam-producing mix is used. It should be of a rubbery nature to provide a highly flexible and resilient interfacial bond. A presently preferred barrier film coating material that bonds well to the previously mentioned polyurethane foam layers and polyacrylate adhesive coatings, is a rubbery butadiene-styrene copolymer, such as Goodyear's "Pliolite 160." A coating solution is applied over the adhesive coating on the liner sheet and is dried to provide a coating weight of about 2 to 15 grains (preferably about 5 grains) per 24 square inches. An incidental advantage of using a non-tacky barrier film coating is that it masks over the tacky adhesive surface and permits of easier storage and handling of the adhesive coated liner sheet preparatory to fabricating the laminated foam damping layer products.

Consistent with the foregoing general teachings, a wide variety of foam-layer vibration-damping constructions can be made. It is not possible to specify simple rules for optimum designs for all the various damping situations of interest, especially since an "optimum" design depends upon weight and cost factors, and judgment as to what degree of vibration damping should be provided in a given situation.

The effectiveness of a given damping structure depends in part upon the environmental temperature range and the vibration intensities at different frequencies of the particular vibrant base, since the relevant properties of the foam-layer structure vary somewhat with temperature and frequency. Calculations based on vibration-damping theory and experience, as known to experts in the art, can be helpful in arriving at satisfactory selections. A strictly cut-and-try approach, especially when employed by an experienced person, can be effectively employed. A test bar or panel of the same material and same thickness as the panel or sheet to be damped can be employed with test equipment that measures vibration attenuation at the frequency or frequencies of principal interest, and the effectiveness of a variety of applied damping sheet samples can be determined and compared to facilitate an initial choice that will be further investigated by observations on a working installation. Another approach is to make up a working installation in the first place that complies with preliminary weight and cost goals, and observe whether a satisfactory vibration level has been obtained. If not, a further layer of vibration-damping sheets can be applied over all or parts of the area, and the results observed to determine whether they are acceptable, and so on. If the single-layer construction appears to be more than adequate, a second installation can be made using a lighter sheet in arriving at an approximate optimum. The use of relatively thin sheet constructions facilitates the arriving at optimum applications since the effect of successive small increments can be studied. A single-ply construction equivalent to the selected multi-ply construction can be substituted in later installations if desired.

A relatively few types of sheeting can be manufactured as stock items and can be employed in proper combinations to provide reasonably satisfactory vibration-damping installations for a great variety of specifically different applications. The saving in cost can more than offset the fact that there is some departure from a truly optimum result in a given installation. On the other hand, where a large sales volume for a given application is contemplated, the design and manufacture of a special vibration-damping sheet especially suited for that particular usage may be justified.

The following specific example illustrates a presently preferred construction of a preformed ready-to-lay adhesive damping sheet that has proved satisfactory for usage under a variety of conditions in single or multiple layer installations, including usage for damping aircraft fuselage panels.

*Example*

Using the teachings of U.S. Patent No. 2,921,916, a polyurethane prepolymer is made by first preparing an alkyd resin of castor oil and diglycollic acid (12.3:1 weight ratio), having an acid number in the range of 4 to 5, which is then mixed and reacted with tolylene diisocyanate (e.g., Du Pont's "Hylene TM") in the proportion of 2.42 parts of the alkyd resin to one part of the diisocyanate; the reaction being conducted at 160 to 220° F. for a length of time sufficient to produce a prepolymer product having a viscosity of 10,000 to 25,000 centipoises at 25° C. as measured with a Brookfield viscometer. Preferably a small proportion of a flame retardant agent is mixed with the prepolymer so as to result in a flame resistant product, as by admixing 5 parts by weight of tris beta chloro ethyl phosphate per 100 parts of prepolymer.

A foam-forming mixture is prepared by mixing 100 parts of the prepolymer with 8 parts, by weight, of a solution of water and diethyl ethanolamine in 4:1 ratio. The water acts as the reactive foam generating agent and the amine serves as a catalyst. The mixture is promptly extruded from the mixing machine into the sheet-forming mold and reacts and cures for 20 minutes to form a sheet of the fully polymerized stable foam layer product, having a bulk density of approximately 10 pounds per cubic foot and a thickness of one-fourth inch. The foam layer possesses a thin skin on each side and a uniform small-celled internal structure.

The foam layer reacts in the mold while sandwiched between a previously inserted adhesive-coated liner sheet on one face and a backing sheet on the other side, resulting in the unitary composite sheet product that is removed from the mold. (See FIG. 2.) The sheet is trimmed to size and so as to trim off the rind-like edges and thus expose the foam layer at the edges of the sheet. This product is preferably post-cured by heating for 8 hours at 150° F.

The presently preferred adhesive-coated liner sheet is a dense supercalendered paper having a shiny-smooth anti-stick surface provided by a coating of a silicone resin release agent, upon which is coated an adhesive consisting of a pressure-sensitive copolymer of isooctyl acrylate and acrylic acid (90:10 ratio) in a 5 grains per 24 sq. in. coating weight (dry basis), coated over with a barrier coating of butadiene-styrene copolymer in a 5.5 grains per 24 sq. in. coating weight (dry basis). This sheet, cut to appropriate size, is inserted in the mold with the adhesive side facing in so that the foam layer bonds to the barrier coating.

The presently preferred backing sheet is a flexible foil-paper laminate consisting of a dead-soft aluminum foil of 1 mil thickness cemented by a very thin casein-neoprene adhesive coating to a supercalendered kraft paper of 4 mils thickness, weighing 200 pounds per thousand square yards. This sheet, cut to appropriate size, is inserted in the mold with the paper side facing in so as to become bonded to the foam layer.

In this construction the soft, flexible, rubbery polyurethane foam layer has a "dead" rubbery characteristic as distinguished from the "live" or highly springy characteristic of an ideal rubber. This is illustrated quantitatively by the following loss tangent values measured at room temperature (25° C.) at various frequencies for various lots and found to be in the range of 0.30 to 0.35 at 100 c.p.s., 0.37 to 0.40 at 300 c.p.s., and 0.41 to 0.45 at 1000 c.p.s. The storage shear modulus values at room temperature (in dynes/sq. cm.) were found to be in the range of $3.9$–$4.7 \times 10^6$ at 100 c.p.s., $4.8$–$5.8 \times 10^6$ at 300 c.p.s., and $8.0$–$9.3 \times 10^6$ at 1000 c.p.s. The constraining layer (foil-paper backing) has a tensional stiffness value that is at least 100 times as great as the shear stiffness value of the polyurethane foam layer, measured at room temperature over the frequency range of 100 to 1000 c.p.s.

This preformed damping sheet weighs 0.25 pound per square foot (as applied after removal of the liner), and when adhered to an aluminum fuselage panel of 40 mils thickness, weighing 0.57 pound per square foot, results in a 44% increase in weight of the area covered by the damping sheet.

We claim:

1. In combination with a vibrant rigid sheet base, a preformed ready-to-lay pressure-sensitive adhesive vibration damping sheet adhered thereto and comprises of a soft rubbery "lossy" vibration-absorbing polyurethane foam layer having a bulk density factor of about 0.05 to 0.5, thinly coated on its face side with an aggressively tacky pressure-sensitive polyacrylate in intimate bonding contact with said base, and a flexible but planar-rigid aluminum foil backing bonded to the back side of the foam layer as a constraining layer; said damping sheet being adapted to substantially attenuate vibrations induced in said base.

2. In combination with a vibrant rigid sheet base, a preformed ready-to-lay pressure-sensitive adhesive vibration damping sheet adhered thereto, comprised of a soft rubbery "lossy" vibration-absorbing foam layer which is bonded on its face side to a coextensive thin film of aggressively-tacky viscoelastic pressure-sensitive adhesive that contacts said base and is capable of stably and permanently bonding said foam layer thereto, and which is bonded on its back side to a coextensive flexible but planar-rigid constraining layer that includes a dead-soft aluminum foil of approximately 1 mil thickness and which has a tensional stiffness value at least 10 times as great as the shear stiffness value of said foam layer; the foam layer having a bulk density factor of about 0.05 to 0.5 and a thickness of about 1/8 inch to one inch, a loss tangent value in the range of about 0.3 to 2.5 and a storage shear modulus value in the range of $10^5$ to $10^9$ dynes per sq. cm.

3. A structure according to claim 2 wherein said foam layer is a polyurethane foam and said adhesive is a pressure-sensitive polyacrylate adhesive.

References Cited in the file of this patent
UNITED STATES PATENTS

| | | |
|---|---|---|
| 2,746,696 | Tierney | May 22, 1956 |
| 2,819,032 | Detrie et al. | Jan. 7, 1958 |
| 2,959,242 | Muller et al. | Nov. 8, 1960 |
| 3,042,545 | Kienle et al. | July 3, 1962 |